US012688625B2

(12) United States Patent
Harpavat et al.

(10) Patent No.: US 12,688,625 B2
(45) Date of Patent: Jul. 21, 2026

(54) SCRIBBLE-TO-VECTOR IMAGE GENERATION

(71) Applicant: ADOBE INC., San Jose, CA (US)

(72) Inventors: Keerti Harpavat, Udaipur (IN); Arshdeep Singh Chugh, New Delhi (IN); Zongze Wu, San Francisco, CA (US); Souymodip Chakraborty, Karnataka (IN); Ankit Phogat, Haryana (IN); Vineet Batra, Delhi (IN)

(73) Assignee: ADOBE INC., San Jose, CA (US)

( * ) Notice: Subject to any disclaimer, the term of this patent is extended or adjusted under 35 U.S.C. 154(b) by 141 days.

(21) Appl. No.: 18/625,432

(22) Filed: Apr. 3, 2024

(65) Prior Publication Data

US 2025/0117990 A1     Apr. 10, 2025

Related U.S. Application Data

(60) Provisional application No. 63/588,375, filed on Oct. 6, 2023.

(51) Int. Cl.
*G06T 11/23* (2026.01)
*G06F 3/04883* (2022.01)

(52) U.S. Cl.
CPC .......... *G06T 11/23* (2026.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 2009/0219298 A1* | 9/2009 | Birdal | .................. | G06T 11/001 |
| | | | | 382/163 |
| 2020/0142994 A1* | 5/2020 | Jin | ........................ | G06N 3/0455 |
| 2021/0064858 A1* | 3/2021 | Batra | ................... | G06V 30/333 |
| 2023/0419551 A1* | 12/2023 | Harikumar | ............. | G06T 9/008 |
| 2024/0112401 A1* | 4/2024 | Achlioptas | ............. | G06T 17/20 |
| 2024/0320444 A1* | 9/2024 | Maschmeyer | ...... | G06F 3/04845 |
| 2024/0346629 A1* | 10/2024 | Harikumar | ............... | G06T 5/73 |
| 2024/0386623 A1* | 11/2024 | Yu | ........................... | G06V 10/82 |
| 2025/0005822 A1* | 1/2025 | Xuan | ........................ | G06T 7/13 |
| 2025/0095259 A1* | 3/2025 | Cheng | .................. | G06V 40/176 |
| 2025/0292455 A1* | 9/2025 | Xiang | .................. | G06V 10/764 |

OTHER PUBLICATIONS

Voynov et al., "Sketch-Guided Text-to-Image Diffusion Models", SIGGRAPH '23: ACM SIGGRAPH 2023 Conference Proceedings Article No. 55, pp. 1-11 (Year: 2023).*
Canny, "A Computational Approach to Edge Detection", In IEEE Transactions on Pattern Analysis and Machine Intelligence, vol. PAMI-8, No. 6, Nov. 1986, pp. 679-698.

(Continued)

*Primary Examiner* — David H Chu
(74) *Attorney, Agent, or Firm* — F. CHAU & ASSOCIATES, LLC

(57) ABSTRACT

A method, apparatus, non-transitory computer readable medium, apparatus, and system for image generation include obtaining a sketch input depicting an object, processing the sketch input to obtain sketch guidance, and generating a synthesized image based on the sketch guidance using an image generation model, where the synthesized image depicts the object from the sketch input.

17 Claims, 13 Drawing Sheets

(56) References Cited

OTHER PUBLICATIONS

Gao, et al., "SketchyCOCO: Image Generation from Freehand Scene Sketches", Computer Vision Foundation, 2020, pp. 5174-5183.

Ronneberger, et al., "U-Net: Convolutional Networks for Biomedical Image Segmentation", arXiv preprint arXiv:1505.04597v1 [cs.CV] May 18, 2015, 8 pages.

Isola, et al., "Image-to-Image Translation with Conditional Adversarial Networks", Computer Vision Foundation, 2018, pp. 1125-1134.

Sangkloy, et al., "Scribbler: Controlling Deep Image Synthesis with Sketch and Color", Computer Vision Foundation, 2017, pp. 5400-5409.

Wang, et al., "High-Resolution Image Synthesis and Semantic Manipulation with Conditional GANs", Computer Vision Foundation, 2018, pp. 8798-8807.

Xiang, et al., "Adversarial Open Domain Adaptation for Sketch-to-Photo Synthesis", Computer Vision Foundation, 2021, pp. 1434-1444.

Xie, et al., "Holistically-Nested Edge Detection", Computer Vision Foundation, 2015, pp. 1395-1403.

Zhang, et al., "Adding Conditional Control to Text-to-Image Diffusion Models", Computer Vision Foundation, arXiv preprint arXiv preprint arXiv:2302.05543. 2023, pp. 3836-3847.

AI Sketch to Image Generator, "Turn your drawings into images in seconds", 1 pages.

Combined Search and Examination Report dated Jan. 31, 2025 in corresponding GB Application No. 2412720.1 (7 pages).

Chen, et al., "DeepFaceDrawing: Deep Generation of Face Images from Sketches", arXiv preprint arXiv:2006.01047v2 [cs.GR] Jun. 5, 2020, 16 pages.

Wu, et al., "DeepPortraitDrawing: Generating human body images from freehand sketches", Computer & Graphics, 116 (2023) pp. 73-81.

Meta, "New AI Research Tool Turns Ideas Into Art", Jul. 14, 2022.

Wu, et al., "SketchScene: Scene Sketch to Image Generation With Diffusion Models", 2023 IEEE International Conference on Multimedia and Expo (ICME), 6 pages.

* cited by examiner

Synthesized
Image

110

120

115

Sketch input

105

100

| Augmentation level 0 | Augmentation level 1 | Augmentation level 2 | Augmentation level 3 |

Obtain a training set including a sketch input    1205

Initialize a sketch encoder based on parameters of an image generator    1210

Train the sketch encoder to generate sketch guidance for the image generation model based on the sketch input    1215

1200

Figure 13:
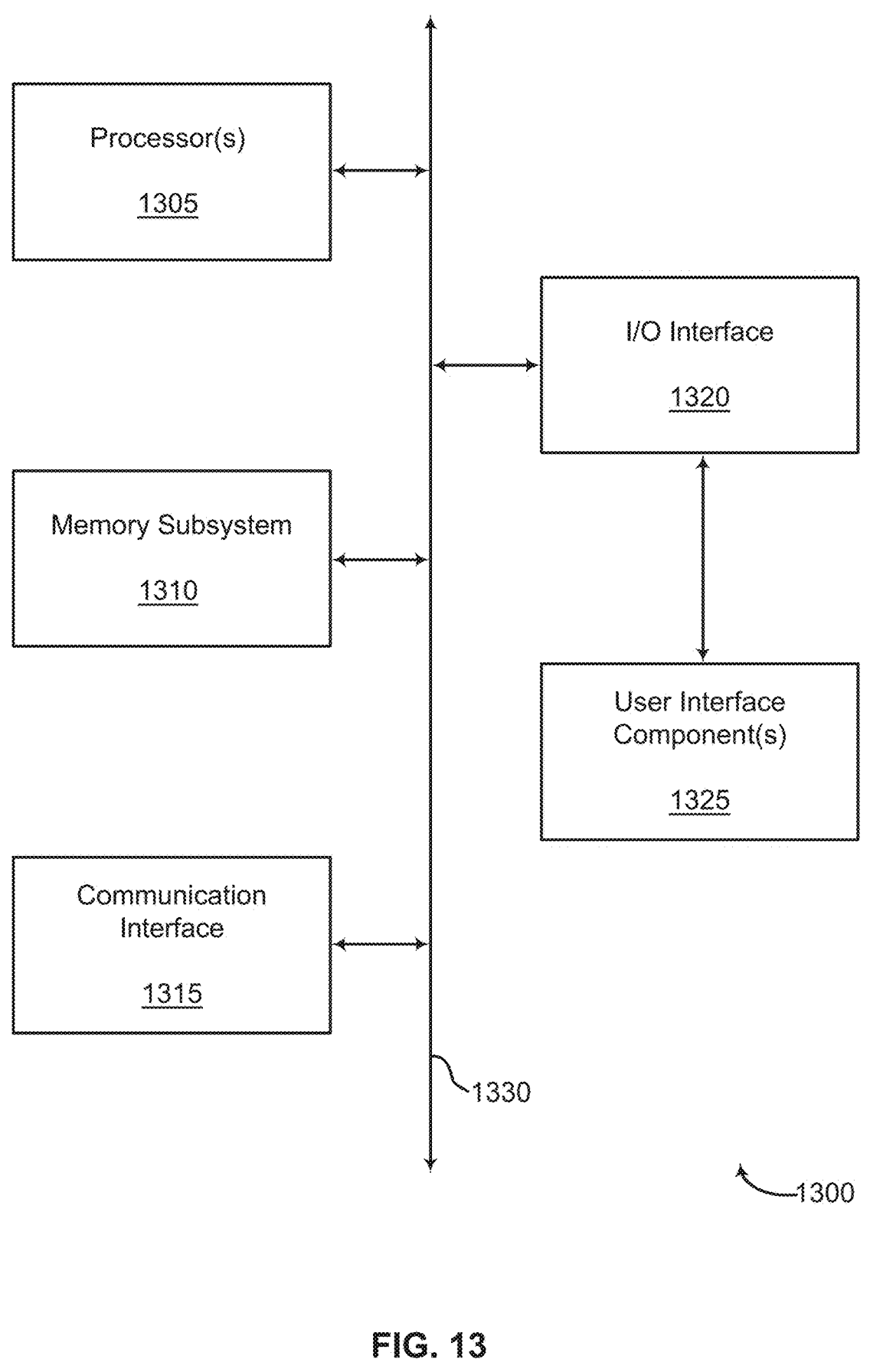

Processor(s)

1305

I/O Interface

1320

Memory Subsystem

1310

User Interface
Component(s)

1325

Communication
Interface

SCRIBBLE-TO-VECTOR IMAGE GENERATION

CROSS REFERENCE TO RELATED APPLICATION

This application claims priority to, and the benefit of, U.S. Provisional Application Ser. No. 63/588,375 filed on Oct. 6, 2023, entitled SCRIBBLE2VECTOR. The entire contents of the foregoing application are hereby incorporated by reference for all purposes.

BACKGROUND

The following relates generally to image processing, and more specifically to image generation using scribbles. Scribbles encompass a wide range of marks made by hand or with digital tools. Scribbles can range from rudimentary doodles capturing the essence of an idea to more elaborate sketches outlining preliminary design concepts. In the area of image processing, scribbles can act as the initial constructs from which digital graphics and designs are manually formulated and provide a direct and engaging method to capture and refine creative visions, thereby fostering innovation and efficiency in design workflows.

In the area of machine learning, image generation models have been used to create images from inputs by learning from datasets of existing images. However, conventional image generation models do not generate synthetic images based on informal inputs such as scribbles that capture the intent of the input.

SUMMARY

The present disclosure relates to a machine learning model trained to generate synthetic images based on sketch input. The sketch input is processed by a sketch encoder. In some examples, the sketch encoder is initialized based on a copy of a pre-trained image generation model and trained using training data that includes training sketch input.

A method, apparatus, non-transitory computer readable medium, and system for image generation are described. One or more aspects of the method, apparatus, non-transitory computer readable medium, and system include obtaining a sketch input depicting an object; processing, using a sketch encoder, the sketch input to obtain sketch guidance; and generating, using an image generation model, a synthesized image based on the sketch guidance, wherein the synthesized image depicts the object from the sketch input.

A method, apparatus, non-transitory computer readable medium, and system for image generation are described. One or more aspects of the method, apparatus, non-transitory computer readable medium, and system include creating a training set including a sketch input, initializing a sketch encoder based on parameters of an image generation model, and training the sketch encoder to generate sketch guidance for the image generation model based on the sketch input.

An apparatus, system, and method for image generation are described. One or more aspects of the apparatus, system, and method include at least one processor, at least one memory storing instruction executable by the at least one processor, a sketch encoder including parameters stored in the at least one memory and trained to generate sketch guidance based on a sketch input; and an image generation model including instruction stored in the at least one memory and trained to generate a synthesized image based on the sketch guidance.

BRIEF DESCRIPTION OF THE DRAWINGS

FIG. 13 shows an example of a system according to aspects of the present disclosure.

DETAILED DESCRIPTION

Figure 1:
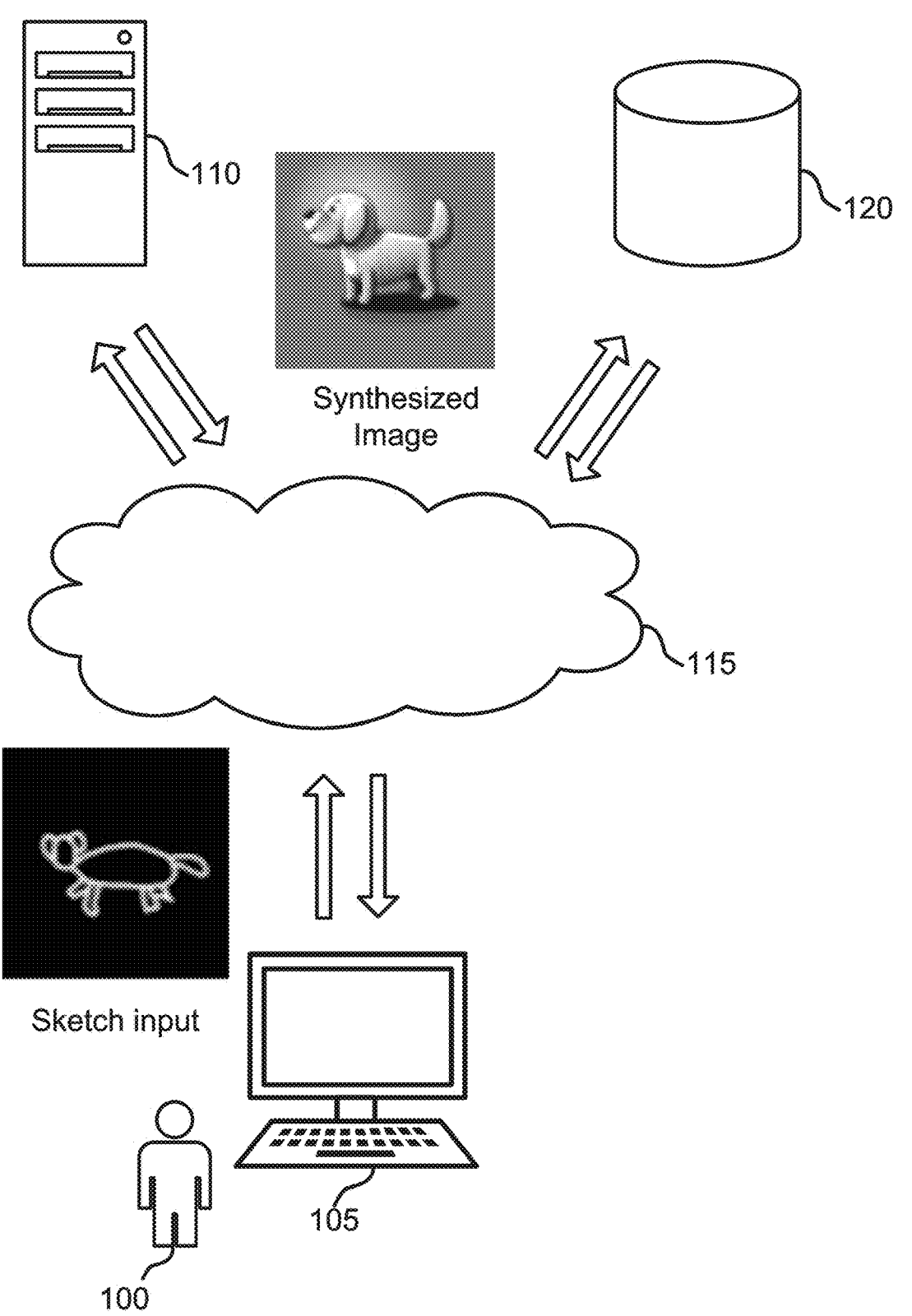
FIG. 1 shows an example of an image processing system according to aspects of the present disclosure.

In the dynamic field of digital art and design, the transition from rudimentary scribbles or sketches to precise digital outputs is a complex process that involves sophisticated technological solutions. Scribbles or sketches can be the first step in this process, serving as initial expressions for artists and designers. In the following disclosure, the terms "sketch" and "scribble" are used synonymously to refer to informal drawings that show a rough outline or approximate features of a desired image. These initial markings, combined with image processing techniques like diffusion models, form the basis for converting informal ideas into structured images. Diffusion models refine inputs into images by learning from data patterns. Diffusion models can be used to generate images based on input including scribbles.

Some methods involve analyzing and interpreting the inherent characteristics of scribbles, such as line quality, direction, and implied shapes, to reconstruct the scribbles into graphics. However, these methods struggle to accurately discern the intentions behind a user's scribbles and may not provide the flexibility to accommodate the vast diversity of scribble styles and complexities, resulting in overly standardized or generic vector outputs that do not faithfully represent the uniqueness of the original sketches.

Embodiments of the present disclosure include an image generation model that improves on conventional image generation models by generating more accurate synthetic images that better capture user intent via informal visual inputs such as scribbles. In some cases, the synthetic images are generated in a way that enables them to be converted into vector graphics. This is achieved using a sketch encoder that generates guidance for an image generation model. The disclosure further provides a method of generating scribble training data to improve the efficiency of training an image generation model to take sketch input. In some examples, a sketch encoder is initialized using parameters from the image generation model and trained using the scribble training data.

Embodiments of the present disclosure improve the accuracy and fidelity of image generation from scribbles or sketches. By adapting diffusion models to convert scribbles into vectors and training these models to retain decoders' capabilities while also customizing the models for specific scribble-based tasks, and by employing a novel data augmentation pipeline to generate training data that closely mimics the scribbles, the system effectively accommodates a wide range of scribble styles and complexities, thereby improving the model's generalization capabilities and offering a versatile tool for artists and designers to translate their ideas into precise, scalable digital formats.

Image Processing Method

Accordingly, the present disclosure includes the following aspects. A method for image generation is described. One or more aspects of the method include obtaining a sketch input; processing, using a sketch encoder, the sketch input to obtain sketch guidance; and generating, using an image generation model, a synthesized image based on the sketch guidance.

Some examples of the method, apparatus, non-transitory computer readable medium, and system further include machining learning model. Some examples further include encoding the text prompt to obtain a text encoding, wherein the synthesized image is generated based on the text encoding.

Some examples of the method, apparatus, non-transitory computer readable medium, and system further include encoding the sketch input comprises performing a zero convolution on the sketch input. Some examples of the method, apparatus, non-transitory computer readable medium, and system further include generating the synthesized image includes providing the sketch guidance as an input to a decoder layer of the image generation model.

Some examples of the method, apparatus, non-transitory computer readable medium, and system further include generating the synthesized image comprises performing a reverse diffusion process. Some examples of the method, apparatus, non-transitory computer readable medium, and system further include encoding the sketch input includes obtaining a noisy input image for the image generation model, wherein the synthesized image is based on the noisy input image. In some aspects, the synthesized image depicts an element of the sketch input with additional detail.

Some examples of the method, apparatus, non-transitory computer readable medium, and system further include encoding the sketch input comprises obtaining a class label indicating a category of the synthesized image, wherein the sketch guidance is generated based on the class label. In some aspects, the category is selected from a set of categories including an outline category and a color image category.

Some examples of the method, apparatus, non-transitory computer readable medium, and system further include generating the synthesized image comprises obtaining an adherence factor indicating a degree of adherence of the synthesized image to the sketch input, wherein the synthesized image is generated based on the adherence factor. In some aspects, the adherence factor is selected from a continuous range.

Some examples of the method, apparatus, non-transitory computer readable medium, and system further include generating the synthesized image comprises applying the adherence factor to the sketch guidance prior to providing the sketch guidance to the image generation model. In some aspects, the sketch encoder is trained using a trainable copy of the image generation model.

FIG. 1 shows an example of an image processing system according to aspects of the present disclosure. The example shown includes user 100, user device 105, image processing apparatus 110, cloud 115, and database 120.

In the example shown in FIG. 1, user 100 provides a sketch input of a cute dog to the image processing apparatus 110 through user device 105, with the interaction facilitated by cloud 115. The image processing apparatus 110, equipped with a sketch encoder, processes the sketch input to capture the essential qualities and attributes of the cute dog depicted in the sketch.

The sketch encoder in image processing apparatus 110 is used to analyze and encode the sketch input, focusing on the dog's form, features, and any other distinctive elements that contribute to the perception of "cuteness." For example, image processing apparatus 110 translates these visual elements into a structured format suitable for image synthesis. Following this encoding process, image processing apparatus 110 employs a generator that takes the encoded data and generates a feature embedding. This embedding is a comprehensive representation of the sketch input, prepared for the final stage of image synthesis.

The decoder component of the image processing apparatus 110 then utilizes the feature embedding to create a synthetic image that embodies the characteristics of the cute dog as originally sketched by user 100. The resultant synthetic image is a detailed and visually appealing representation of the concept conveyed in the sketch input. This image is then transmitted back to user 100 through cloud 115 and user device 105, showcasing the apparatus's capability to transform a user's sketch input into a high-quality and accurate visual output. This process effectively demonstrates the system's proficiency in interpreting and materializing user-generated sketches into finished images that fulfill the user's creative intentions.

User device 105 may be a personal computer, laptop computer, mainframe computer, palmtop computer, personal assistant, mobile device, or any other suitable processing apparatus. In some examples, user device 105 includes software that incorporates an image processing application (e.g., query answering, image editing, relationship detection). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code that is sent to the user device 105 and rendered locally by a browser. The process of using the image processing apparatus 110 is further described with reference to FIG. 2.

Image processing apparatus 110 includes a computer implemented network comprising an image encoder, a text encoder, a multi-modal encoder, and a decoder. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 5-6. Further detail regarding the operation of image processing apparatus 110 is provided with reference to FIGS. 5-6.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, database controllers may operate automatically without user interaction.

Figure 2:
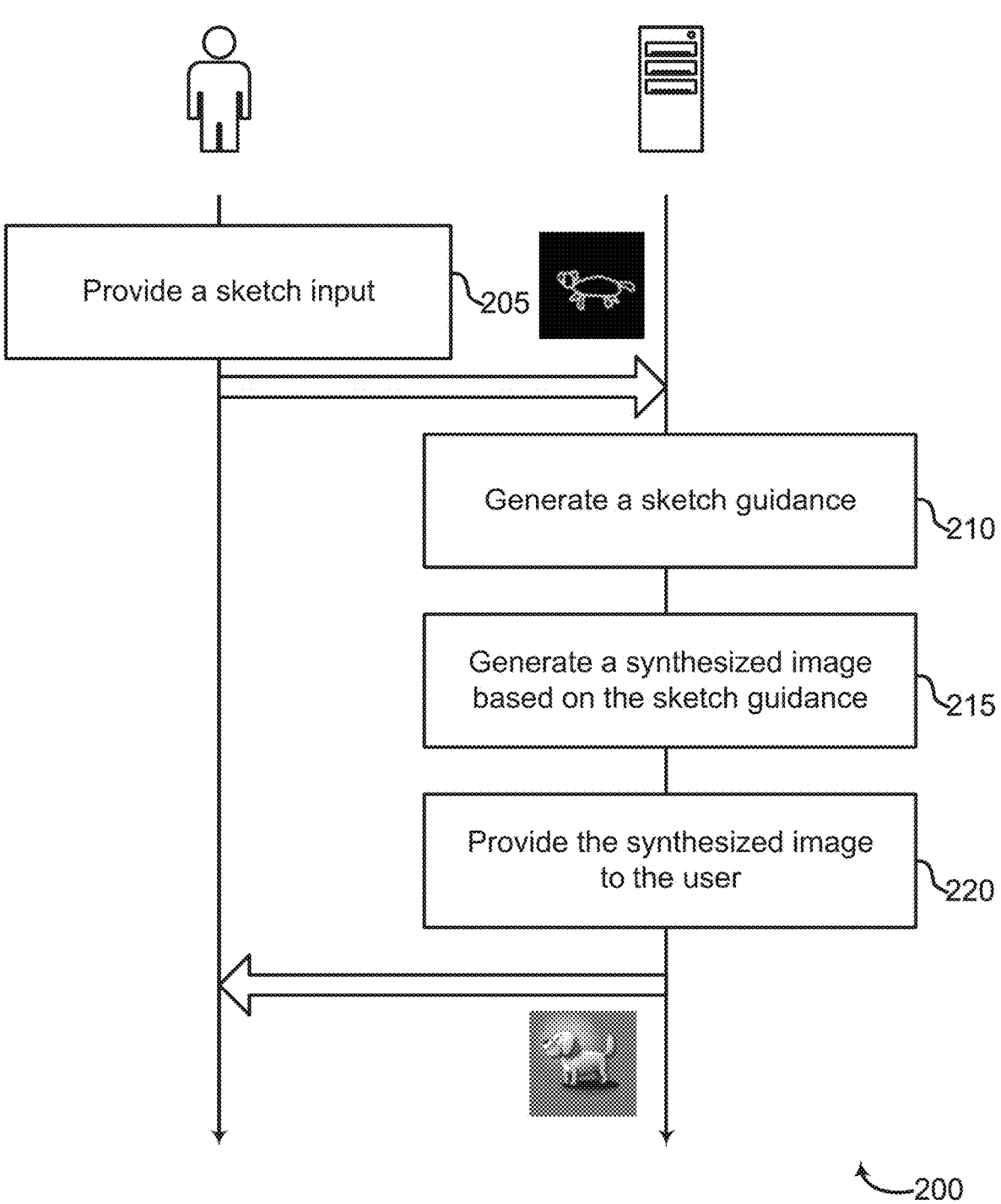
FIG. 2 shows an example of an image processing application according to aspects of the present disclosure.

FIG. 2 shows an example of an image processing application 200 according to aspects of the present disclosure. The image processing application 200 is an example of, or includes aspects of, the corresponding element described with reference to FIGS. 3, 4, 6-11, and 13.

At operation 205, a user provides a sketch input. For example, the user begins the image generation process by inputting a sketch depicting a cute dog. In this way, the user provides a visual input that will guide the subsequent image synthesis. The sketch input captures the essential shapes, features, and perhaps intended expression or pose of the cute dog as envisioned by the user.

At operation 210, the system generates a sketch guidance. For example, the system processes the sketch input to generate sketch guidance. This operation involves analyzing the sketch input, breaking it down into its constituent elements, and encoding these into a format that can be understood and utilized by the image generation model. The sketch guidance serves as a detailed blueprint of the user's input, preserving the key attributes and nuances of the cute dog depicted in the sketch while converting it into a structured form ready for synthesis.

At operation 215, the system generates a synthesized image based on the sketch guidance. For example, the system employs an image generation model to create a synthetic image that visually represents the cute dog as sketched by the user. Using the sketch guidance as a directive, the image generation model synthesizes an image that seeks to reflect the user's artistic vision, paying close attention to the form, features, and overall aesthetic of the cute dog. The generator works to ensure that the synthesized image is both visually coherent and faithful to the original sketch input, producing a high-quality and representative depiction of a cute dog.

At operation 220, the system provides the synthesized image to the user. For example, the system presents the generated synthetic image back to the user. This final step completes the cycle of transformation from sketch to synthetic image, offering the user a visual representation of their initial sketch input. The user can review the synthesized image to assess its quality, accuracy, and overall alignment with their creative intent. The generated synthesized image showcases the system's capabilities in interpreting and rendering sketches into detailed and charming synthetic images, allowing users to see their creative concepts realized in vivid visual form.

Figure 3:
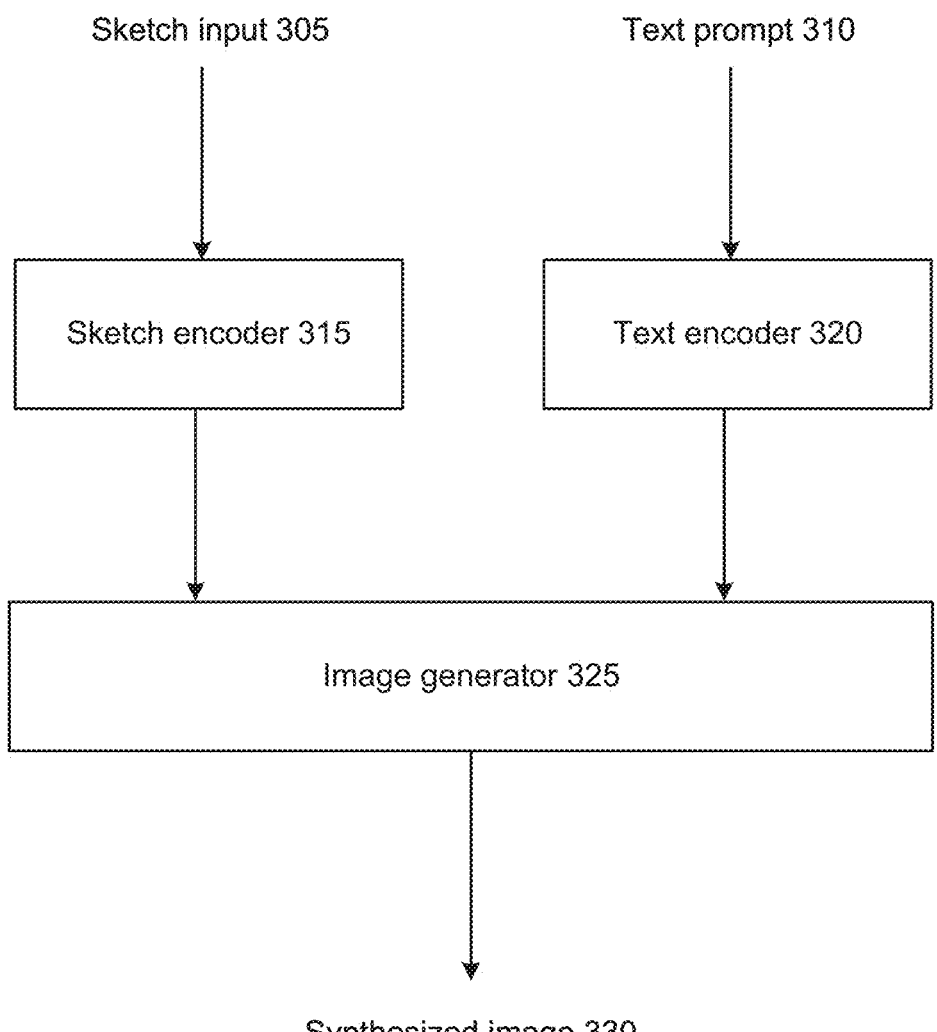
FIG. 3 shows an example of a method of generating a synthetic image according to aspects of the present disclosure.

FIG. 3 shows an example of a method 300 of generating a synthesized image according to aspects of the present disclosure. Method 300 is an example of, or includes aspects of, the corresponding element described with reference to FIGS. 2, 4, 6-11, and 13.

Referring to FIG. 3, an example method of generating a synthetic image is described. At the beginning of the process, sketch input 305 represents the initial visual directive provided by the user. This can be a hand-drawn sketch or a digital drawing, serving as the primary structural and conceptual guide for the synthetic image. In some examples, sketch input 305captures the essential shapes, lines, and intended design elements that the user wishes to see reflected in the final image.

In some cases, text prompt 310 is obtained. Text prompt 310 provides an additional layer of semantic guidance for the image generation process. Text prompt 310 may include descriptions, instructions, or any other textual information that provides context or specific details about the desired outcome of the synthetic image. Text prompt 310 complements the visual information provided by the sketch input, offering a more nuanced understanding of the user's intent.

The sketch input 305 is then processed by sketch encoder 315, which translates the visual information into a structured format that can be effectively utilized by the image generation model. The sketch encoder 315 analyzes the lines, shapes, and overall structure of the sketch, encoding these elements into a form that captures the essence of the original input while making it interpretable by the image generation system.

Text prompt 310 is processed by text encoder 320. Text encoder 320 encodes the textual information into a feature-rich representation that encapsulates the semantic nuances of the text. Text encoder 320 ensures that the details, context, and specificities contained in the text prompt are effectively communicated to the image generation model, influencing the attributes and characteristics of the synthesized image.

The outputs of sketch encoder 315 and text encoder 320 are then inputted into image generation model 325. Image generation model 325 integrates the encoded sketch and text inputs to generate a synthetic image that aligns with the user's provided directives. Image generation model 325 leverages advanced algorithms and models to interpret the combined guidance, synthesizing an image that reflects both the structural and stylistic elements conveyed through the sketch and text inputs.

Finally, image generation model 325 generates synthesized image 330 as output image. Synthesized image 330 image represents a visual creation that embodies the user's artistic vision as interpreted and rendered through the sophisticated architecture of the image generation system.

Figure 4:
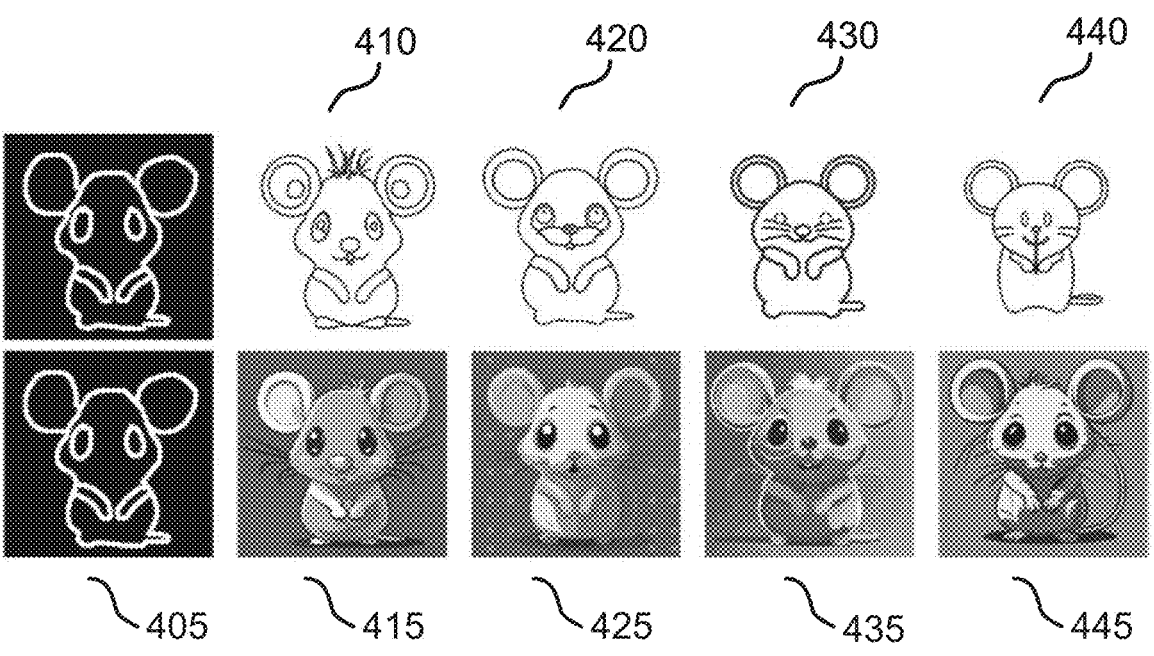
FIG. 4 shows examples of generated synthetic images according to aspects of the present disclosure.

FIG. 4 shows examples of synthesized images 400 according to aspects of the present disclosure. The synthesized images are examples of, or include aspects of, the corresponding element described with reference to FIGS. 2, 3, 6-11, and 13.

Referring to FIG. 4, a series of images are depicted to demonstrate the results of an image generation process that incorporates user inputs, including a rough scribble, optional text prompts, and specified output types and augmentation levels. The images shown are the results after vectorization using some real-world image editing application, showcasing the system's ability to generate both outlines and colored images with varying levels of detail and complexity based on user-defined preferences and inputs.

Sketch input 405 represents the initial user-provided scribble that serves as the foundational directive for the image generation. For example, sketch input 405 is a rough drawing provided by the user, which outlines the basic shape, structure, or concept they wish to see in the final image. Sketch input 405 sets the stage for the subsequent image generation and augmentation processes, providing the essential visual cues and guidelines that will be interpreted and elaborated upon by the system.

In the first row of FIG. 4, a series of outline images 410, 420, 430, and 440 are displayed, each representing a different augmentation level ranging from 0 to 3. These outline images are the result of applying increasing levels of augmentation to the original sketch input, demonstrating the system's capacity to refine and diversify the output based on specified augmentation levels. Outline image 410, with augmentation level 0, represents the most basic and least altered version of the original sketch. For outline images 410, 420, 430, and 440, each subsequent image exhibits a higher level of augmentation, introducing more variations and complexities that reflect a greater deviation from the original sketch input. These outline images 410, 420, 430, and 440 showcase the system's ability to produce a range of results from a single input, allowing users to choose the level of detail and abstraction that best suits their needs or preferences.

In the second row of FIG. 4, a series of colored images 415, 425, 435, and 445 are displayed, again with increasing augmentation levels from 0 to 3, respectively. Similar to the first row, these colored images demonstrate the system's ability to apply varying levels of augmentation to produce a spectrum of results. Colored image 415, with augmentation level 0, shows the most direct and least augmented interpretation of the original sketch input, while colored images 425, 435, and 445 exhibit progressively more complex and detailed results, reflecting higher levels of augmentation. These colored images not only vary in the level of detail and stylization but also include colorization, providing a richer and more visually engaging representation of the original sketch input. The variation in colors and shading adds depth and dimension to the images, enhancing the overall aesthetic appeal and providing users with a diverse set of options for their final outputs.

Figure 5:
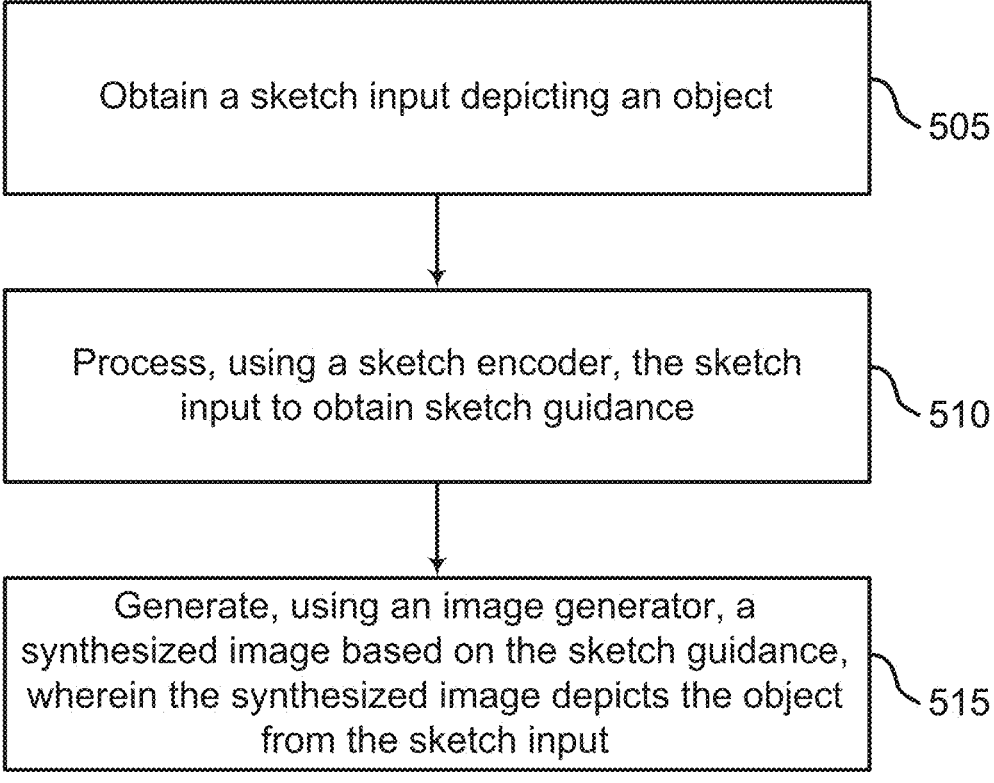
FIG. 5 shows an example of a method for image processing according to aspects of the present disclosure.

FIG. 5 shows an example of a method 500 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains a sketch input. In some cases, the operations of this step refer to, or may be performed by, a machine learning model as described with reference to FIG. 6.

For example, at operation 505, the system obtains a sketch input. In some examples, obtaining the sketch input might involve direct digital sketching on a user interface or uploading pre-drawn sketches. The operations of this step provide the initial data input for the image generation process.

In some examples, obtaining the sketch input involves receiving a visual representation drawn or provided by the user, which is a form of directive for the synthesized image. In some examples, obtaining the sketch input involves direct digital sketching on a user interface, where users can use various tools to create a sketch on a digital canvas. In some cases, users can upload pre-drawn sketches or images, which are then interpreted as sketch inputs by the system. These inputs range from simple line drawings to more complex compositions, depending on the user's preference and the capabilities of the system. The sketch input serves as the initial data input, setting the stage for the subsequent operations that will collectively transform this initial sketch into a refined, synthesized image. The sketch input captures the user's intent and creative vision, which will be reflected and elaborated upon in the final output.

At operation 510, the system processes, using a sketch encoder, the sketch input to obtain sketch guidance. In some cases, the operations of this step refer to, or may be performed by, a sketch encoder as described with reference to FIG. 6.

For example, at operation 510, the system processes the sketch input using a sketch encoder to obtain sketch guidance. For example, encoding the sketch input involves performing a zero convolution on the sketch input or obtaining a noisy input image for the image generation model. Zero convolution involves applying a convolutional filter with all weights set to zero, effectively serving as a mechanism to initialize or reset the encoding process. This technique might be particularly useful in preparing the sketch input for further, more nuanced encoding processes by standardizing or normalizing the input data.

In some examples, the system obtains a noisy input image for the image generation model. This may involve deliberately introducing noise into the sketch input, simulating the variability and imperfections inherent in human-drawn sketches. This noise may be added uniformly or according to a specific distribution, reflecting the stochastic nature of hand drawings. The noisy image serves as a more challenging and realistic training or processing input for the image generation model, encouraging the development of robust and adaptive image generation capabilities.

In some examples, the sketch encoder is trained using a trainable copy of the image generation model, adapting its encoding strategy based on the unique characteristics of the input. For example, by leveraging a version of the image generation model that is specifically tailored for training, the sketch encoder can learn from the image generation patterns and outcomes, continuously improving its ability to translate sketch inputs into effective sketch guidance. In some cases, the sketch guidance is generated based on various factors, including a class label indicating the category of the synthesized image. In some examples, the category is selected from a set including an outline category and a color image category.

At operation 515, the system generates, using an image generation model, a synthesized image based on the sketch guidance. In some cases, the operations of this step refer to, or may be performed by, an image generation model as described with reference to FIG. 6.

For example, at operation 515, the system generates a synthesized image based on the sketch guidance using an image generation model. This operation converts the detailed and structured sketch guidance into a visual output that reflects the user's initial sketch input. According to some embodiments, the image generation model employs algorithms and models to interpret the sketch guidance, synthesizing an image that aligns with the stylistic and structural characteristics conveyed in the original sketch.

In some examples, generating the synthesized image involves providing the sketch guidance as an input to a decoder layer of the image generation model. The decoder layer is responsible for reconstructing and elaborating the image based on the encoded guidance. The decoder layer works by progressively building up the image, adding details and refinements at each stage of the decoding process. By feeding the sketch guidance into the decoder layer, the system ensures that the final image retains the essential elements and style of the original sketch while also benefiting from the enhanced capabilities of the image generation model to produce a polished and refined output.

For example, the system performs a reverse diffusion process to generate the synthesized image. In a reverse diffusion process, the image generation model starts with a version of the sketch guidance that has been deliberately noised or distorted, then gradually works to reverse this noise, iteratively refining and clarifying the image. The reverse diffusion process, by allowing for a controlled and gradual build-up of visual information, generates images that are both highly detailed and robustly aligned with the sketch guidance.

In some embodiments, the synthesized image is generated based on an adherence factor indicating a degree of adherence of the synthesized image to the sketch input. This adherence factor can be selected from a continuous range, offering a spectrum of adherence levels from strict compliance to more creative freedom. Before providing the sketch guidance to the image generation model, the adherence factor is applied to the sketch guidance, allowing for fine control over the resulting image's fidelity to the original sketch. In some examples, the synthesized image depicts an element of the sketch input with additional detail, enhancing the visual complexity and depth of the final output.

In some embodiments, a machine learning model such as the image generator 325 is trained to generate a vectorizable image. A vectorizable image can refer to an image that can be efficiently vectorized. For example, a vectorizable image can have flat colors and a relatively few number of strokes. Accordingly, in some examples, a pixel-based image can be generated by the image generator and the pixel-based image is subsequently transformed into a vector image (i.e., "vectorization"). Alternatively, in some examples the image generator can generate a vector image directly.

Image Generation Apparatus

An apparatus for image generation is described. One or more aspects of the apparatus include at least one processor; at least one memory storing instruction executable by the at least one processor; a sketch encoder comprising parameters stored in the at least one memory and trained to generate sketch guidance based on a sketch input; and an image generation model comprising instruction stored in the at least one memory and trained to generate a synthesized image based on the sketch guidance.

In some aspects, the image generation model comprises a diffusion model. In some aspects, the sketch encoder comprises a zero-convolution layer and a layer based on an encoder layer of the image generation model.

Figure 6:
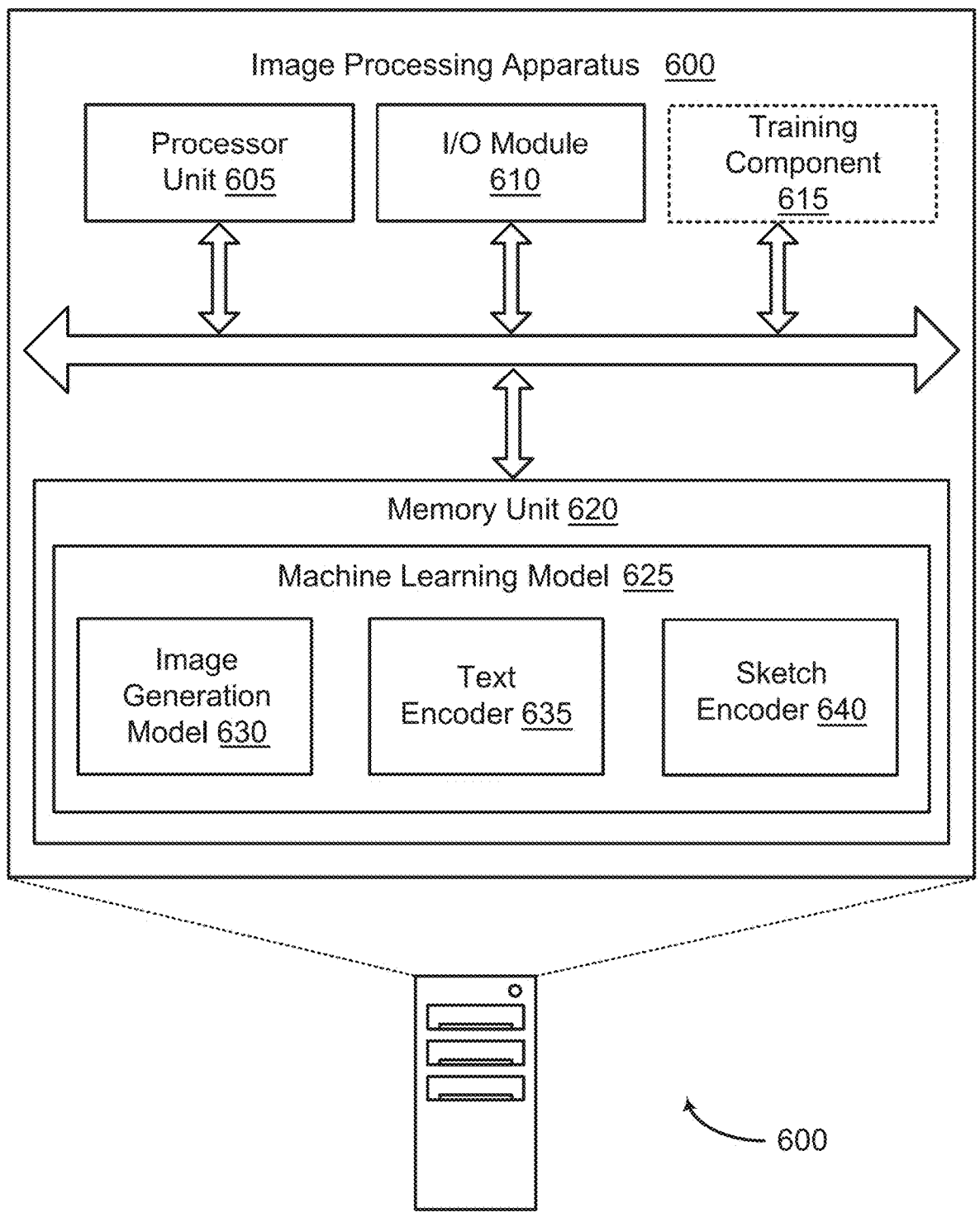
FIG. 6 shows an example of an image processing apparatus according to aspects of the present disclosure.

FIG. 6 shows an example of an image generation apparatus 600 according to aspects of the present disclosure. Image generation apparatus 600 is an example of, or includes aspects of, the corresponding element described with reference to FIGS. 2-4, 7-11, and 13. In one aspect, image generation apparatus 600 includes processor unit 605, I/O module 610, training component 615, memory unit 620, machine learning model 625 including image generation model 630, text encoder 635, and sketch encoder 640.

Processor unit 605 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 605 is configured to operate a memory array using a memory controller. In other cases, a memory controller is integrated into processor unit 605. In some cases, processor unit 605 is configured to execute computer-readable instructions stored in memory unit 620 to perform various functions. In some aspects, processor unit 605 includes special purpose components for modem processing, baseband processing, digital signal processing, or transmission processing. According to some aspects, processor unit 605 comprises one or more processors described with reference to FIG. 13.

Memory unit 620 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 605 to perform various functions described herein.

In some cases, memory unit 620 includes a basic input/output system (BIOS) that controls basic hardware or software operations, such as an interaction with peripheral components or devices. In some cases, memory unit 620 includes a memory controller that operates memory cells of memory unit 620. For example, the memory controller may include a row decoder, column decoder, or both. In some cases, memory cells within memory unit 620 store information in the form of a logical state. According to some aspects, memory unit 620 comprises the memory subsystem described with reference to FIG. 13.

According to some aspects, image generation apparatus 600 uses one or more processors of processor unit 605 to execute instructions stored in memory unit 620 to perform functions described herein. For example, in some cases, the image generation apparatus 600 obtains a prompt. In some cases, the prompt comprises a text prompt. For example, in some cases, the image generation apparatus 600 obtains a sketch input.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result).

The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 630 is included in the image generation apparatus 600. As part of the machine learning model 625, image generation model 630 generates synthesized images based on inputs received from various sources such as text prompts or sketches. In some examples, image generation model 630 works in conjunction with other components of the apparatus, utilizing algorithms and data processed by the processor unit 605 to create visually coherent and contextually relevant images.

According to some aspects, text encoder 635 is included in the image generation apparatus 600. Text encoder 635 interprets and encodes textual data into a format that is understandable and usable by the machine learning model 625, particularly the image generation model 630. In some examples, text encoder 635 takes text prompts, which may contain descriptive or directive information about the desired image and converts them into a feature-rich representation. This representation serves as a guide for the image generation model 630, influencing the attributes and characteristics of the generated image to ensure they align with the user's intent expressed in the text prompt.

According to some aspects, sketch encoder 640 is included in the image generation apparatus 600 to process and encode sketch inputs. The sketch encoder 640 transforms user-drawn sketches into a structured format that the image generation model 630 can understand and utilize in the image generation process. For example, sketch encoder 640 is used to capture the stylistic and structural elements of the user's sketches, ensuring that these are accurately reflected in the final image output. By encoding these sketches, the sketch encoder 640 allows the image generation apparatus 600 to incorporate user-specific details and nuances, thereby producing images that are not only high in quality but also personalized and closely aligned with the user's creative vision.

Figure 7:
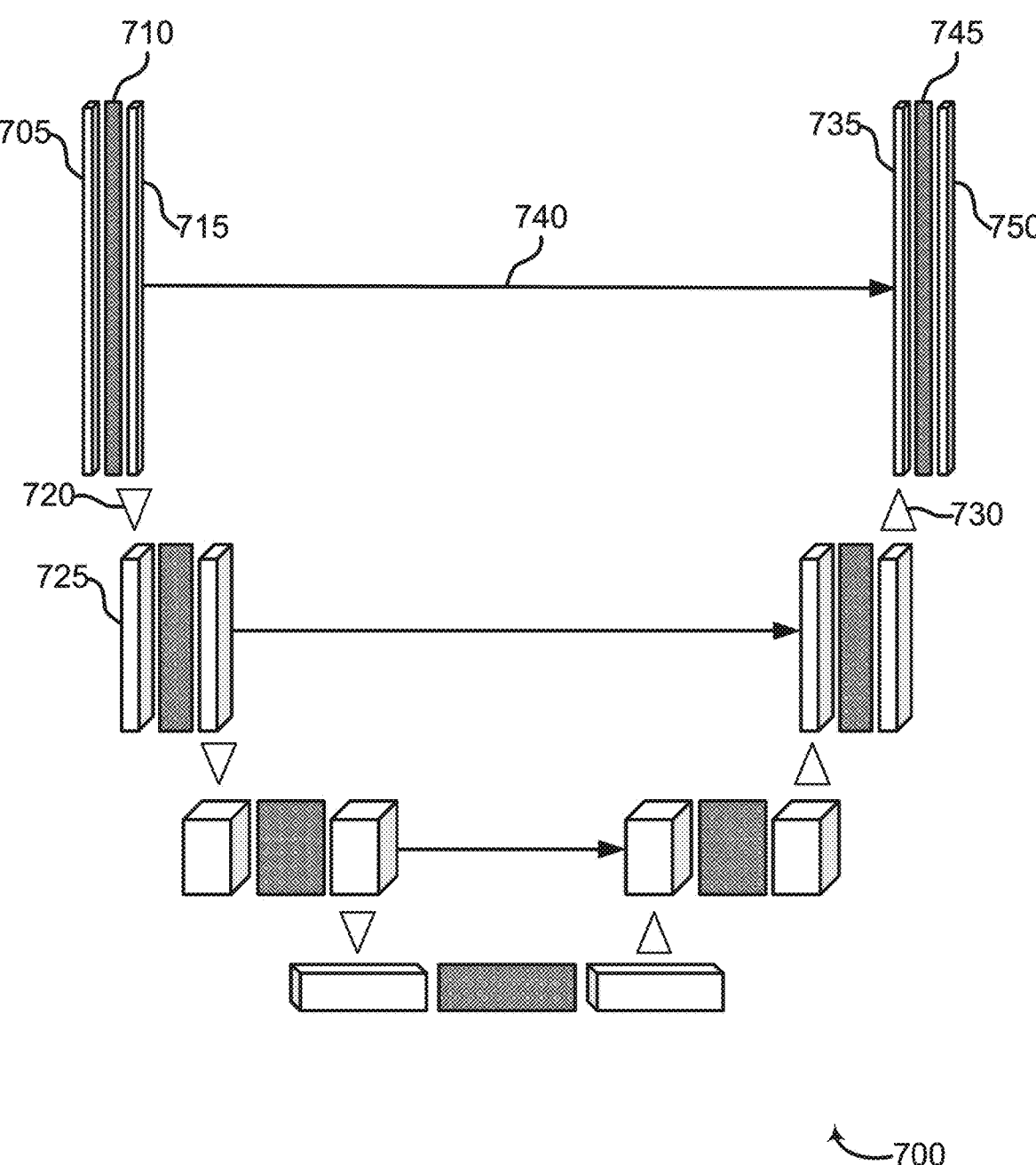
FIG. 7 shows an example oof a U-Net according to aspects of the present disclosure.

FIG. 7 shows an example of U-Net 700 according to aspects of the present disclosure. U-Net 700 is an example of, or includes aspects of, the corresponding element described with reference to FIGS. 2-4, 6, 8-11, and 13. According to some aspects, a diffusion model comprises an ANN architecture known as a U-Net. In some cases, U-Net 700 implements reverse diffusion processes.

According to some aspects, U-Net 700 receives input features 705. Input features 705 include an initial resolution and an initial number of channels, and processes input features 705 using an initial neural network layer 710 (e.g., a convolutional neural network layer) to produce intermediate features 715.

In some cases, intermediate features 715 are then downsampled using a down-sampling layer 720 such that downsampled features 725 have a resolution less than the initial resolution and a number of channels greater than the initial number of channels. In some cases, this process is repeated multiple times, and then the process is reversed. For example, down-sampled features 725 are up-sampled using up-sampling process 730 to obtain up-sampled features 735. In some cases, up-sampled features 735 are combined with intermediate features 715 having the same resolution and number of channels via skip connection 740. In some cases, the combination of intermediate features 715 and up-sampled features 735 are processed using final neural network layer 745 to produce output features 750. In some cases, output features 750 have the same resolution as the initial resolution and the same number of channels as the initial number of channels.

According to some aspects, U-Net 700 receives additional input features to produce a conditionally generated output. In some cases, the additional input features include a vector representation of an input prompt. In some cases, the additional input features are combined with intermediate features 715 within U-Net 700 at one or more layers. For example, in some cases, a cross-attention module is used to combine the additional input features and intermediate features 715.

Training an Image Generation Model

A method for training an image generation model is described. One or more aspects of the method include creating a training set including a sketch input; initializing a sketch encoder based on parameters of an image generation model; and training the sketch encoder to generate sketch guidance for the image generation model based on the sketch input. In some cases, creating a training set can include obtaining a preexisting set of training data for training the machine learning model.

Some examples of the method, apparatus, non-transitory computer readable medium, and system further include training the sketch encoder comprises generating, using the image generation model, a synthetic image based on an output of the sketch encoder; and computing a loss function based on the synthetic image and a ground-truth image. Some examples of the method, apparatus, non-transitory computer readable medium, and system further include creating the training set comprises: generating the sketch input based on a ground-truth image by applying white-fill, black-stroke, path dropping, stroke width augmentation, control point perturbation, path translation, rotation, or any combination thereof. Some examples of the method, apparatus, non-transitory computer readable medium, and system further include initializing the sketch encoder comprises: copying the parameters of an encoder of the image generation model.

Figure 8:
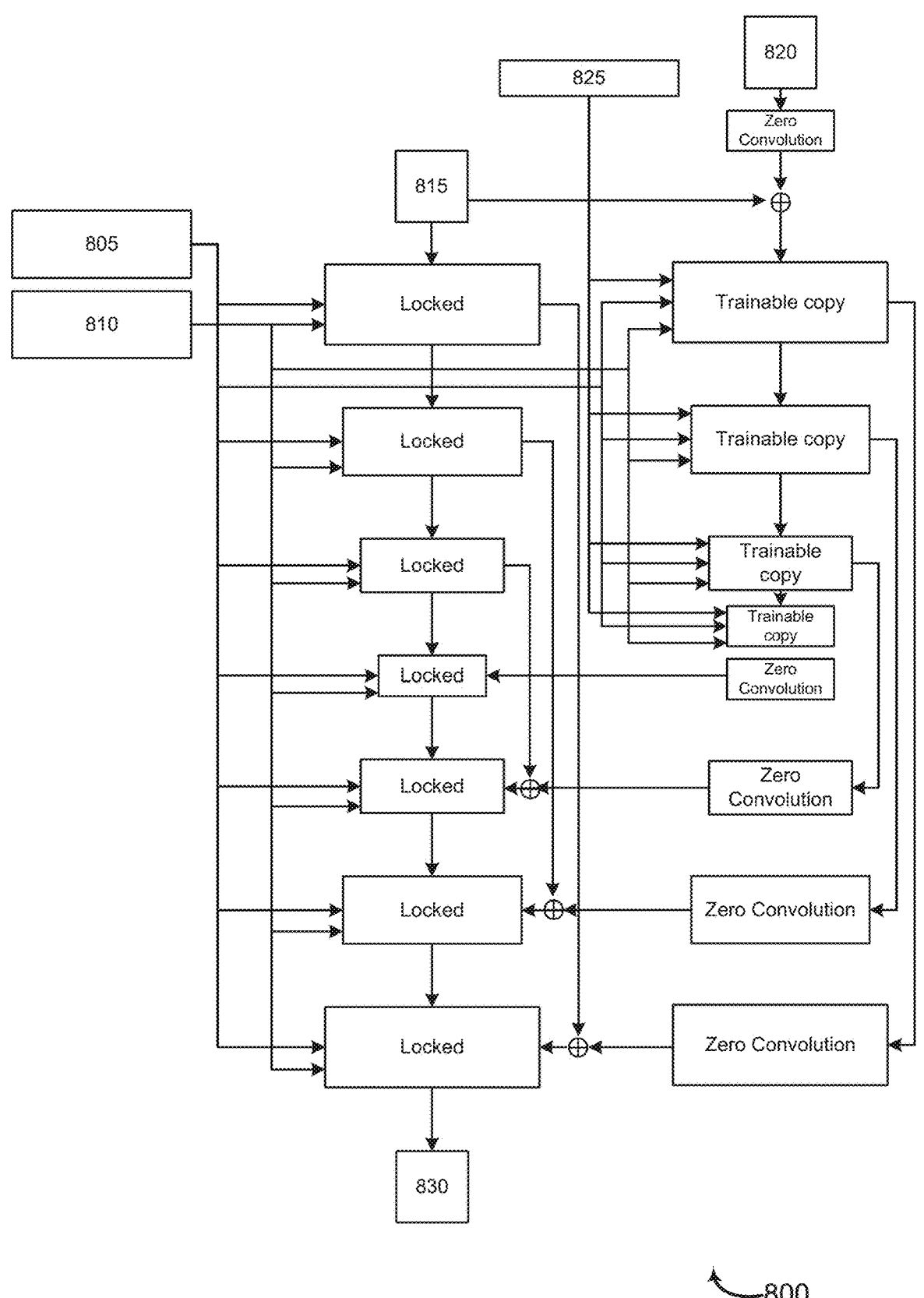
FIG. 8 shows an example of a sketch encoder according to aspects of the present disclosure.

FIG. 8 shows an example of a sketch encoder 800 according to aspects of the present disclosure. The sketch encoder 800 is an example of, or includes aspects of, the corresponding element described with reference to FIGS. 2-4, 6, 7, 9-11, and 13.

According to some embodiments, a sketch encoder uses a ControlNet architecture as a guidance network architecture to facilitate the synthesis of images based on user-specified guidance for image generation. For example, a ControlNet is used as an encoder to encode the scribble input to generate the scribble guidance. However, embodiments of the present disclosure are not limited thereto. An architecture different from the ControlNet architecture can be used as the scribble encoder. For example, a Vision Transformer Adapter can be used as the scribble encoder.

According to some embodiments, the sketch encoder leverages scribble inputs and optional text prompts to direct the creation of both colored and black-and-white images, effectively utilizing vector-based representations and outlines. In some examples, the sketch encoder, fine-tuned for specific image characteristics, orchestrates the synthesis process atop a pre-trained diffusion model framework, ensuring the generated images adhere to desired stylistic and structural parameters. By using the sketch encoder, the image generation model generates synthesized images that closely align with user intent and aesthetic preferences.

A ControlNet is a neural network architecture that allows guiding image generation via Diffusion Models, through user-specified control signals. It creates a trainable copy of the U-Net encoder, and only fine-tuning this copy, freezing the original U-Net. This encoder copy is connected to the U-Net decoder through trainable 1×1 zero convolution blocks. Since the original U-Net is not affected, and a new encoder copy learns to follow the control signals, Control-Net allows efficient fine-tuning of large diffusion models for such specific tasks, without losing the generative power of the base model. Accordingly, a sketch encoder such as a ControlNet provides scribble as the control signal for guiding image generation using an optional text prompt.

A guidance network is used to provide a control signal for guiding image generation. In some embodiments, a guidance network is a scribble encoder that encodes a scribble input to generate a scribble guidance. In some examples, the scribble encoder encodes an outline image to generate a scribble guidance. In some embodiments, the guidance network can be a ControlNet. However, embodiments of the present disclosure are not limited thereto. For example, the guidance network can have an architecture other than a ControlNet architecture, such as a Vision Transformer Adapter architecture. The sketch encoder may be a neural network architecture that enables guiding image generation for image generation models through user-specified control signals. In some examples, a guidance network creates a trainable copy of an encoder, and only fine-tunes this copy, freezing the original decoder. This encoder copy can be connected to the decoder through trainable 1×1 zero convolution blocks. Since the original encoder is not affected, and a new encoder copy learns to follow the control signals, efficient fine-tuning of large models is possible for specific tasks without losing the generative power of the base model. A scribble can be used as a control signal for guiding image generation. Additionally, an optional text prompt can be used, and the image generation model generates images based on the scribble and the text prompt.

For example, let $h_c \in \mathbb{R}^{h \times w}$ be a scribble control signal, and let x be an optional text prompt for image generation. Let C be the guidance network with θ and $\theta_{train}$ as its locked and trainable parameters, respectively, and c be the class label. The generated RGB image $y \in \mathbb{R}^{h \times w \times 3}$ is obtained as:

$$y = C(x, h_c, c; \theta, \theta_{train}) \tag{1}$$

In one example, h=w=128.

In some embodiments, a pre-trained diffusion model is instantiated, and its weights are locked. Then, a trainable copy of the encoder can also be initialized with the same weights as the base encoder. The weights of the trainable copy are unlocked. The base model receives the noise map as before, and the trainable copy concatenates this noise map with the scribble hint. The outputs from each layer of the trainable encoder can be multiplied by trainable 1×1 zero convolution layers and added to the corresponding outputs of the base encoder layers. The class labels are also passed to the trainable encoder to control the type of image generation and fidelity to input scribble. In some embodiments, the image generation model employed may be distinct from a diffusion model and may include alternatives such as GANs or autoencoders.

Referring to FIG. 8, an image generation process is directed by guidance signals including scribble input 820 and text prompt 805. In some cases, text prompt 805 may be optional, and the guidance signals may include scribble input 820 and does not include text prompt 805. For example, scribble input 820 provides structural or stylistic guidance as the primary control signal, and text prompt 805 provides an additional layer of semantic context or directives for the image generation process, enhancing the specificity and relevance of the generated image to the user's intent.

In some embodiments, time 810 determines the stages of image generation within the diffusion process, affecting how noise map 815 and other inputs are processed over time. Time 810, when encoded and input into the sketch encoder, provides temporal component for orchestrating the sequential nature of the diffusion process and managing the transformation of inputs into the final coherent output image.

In some embodiments, noise map 815 is an input for the diffusion model, and it contributes to the generation of high-quality images through the controlled introduction and subsequent reversal of noise. In some embodiments, noise map 815 is manipulated over time 810. This manipulation facilitates a gradual evolution of the output image 830. The evolution is influenced by directives from sketch encoder, which utilizes scribble input 820 and text prompt 805.

In some embodiments, scribble input 820 acts as the primary control signal for guiding the image synthesis and is encoded and interpreted by sketch encoder to ensure that the generated images conform to the user-specified structural guidance. In some examples, scribble input 820 is user-generated input and allows for personalized and detailed control over the image generation process.

In some embodiments, class label 825 is used as a categorical control within the image generation process, providing a mechanism to refine and direct the synthesis of images according to predefined parameters. Class label 825 is integral for class conditioning in the diffusion model, enhancing the adaptability and precision of the generated output. In some embodiments, class label 825 enables the modulation of fidelity in the generated images relative to the scribble hints. For example, class label 825 allows for the adjustment of how closely the generated image adheres to the original scribble's structural and stylistic details. The system incorporates several fidelity levels, each associated with a specific class label, offering users a range of options from high fidelity to more abstract representations. In some embodiments, class label 825 is used for determining the stylistic outcome of the image generation process. It facilitates the choice between generating outlined images and colored images. Class label 825 thus enables users to influence whether the model produces outline-based representations or fully colored and detailed illustrations, further enhancing the creative control available in the image generation process.

In some embodiments, output image 830 is a synthesized image generated by the image generation model including the sketch encoder, reflecting the combined influence of text prompt 805, scribble input 820, class label 825, and the evolving noise map 815 over time 810. The output image 830 conforms to the user-defined input and is both visually cohesive and contextually aligned.

Figure 9:
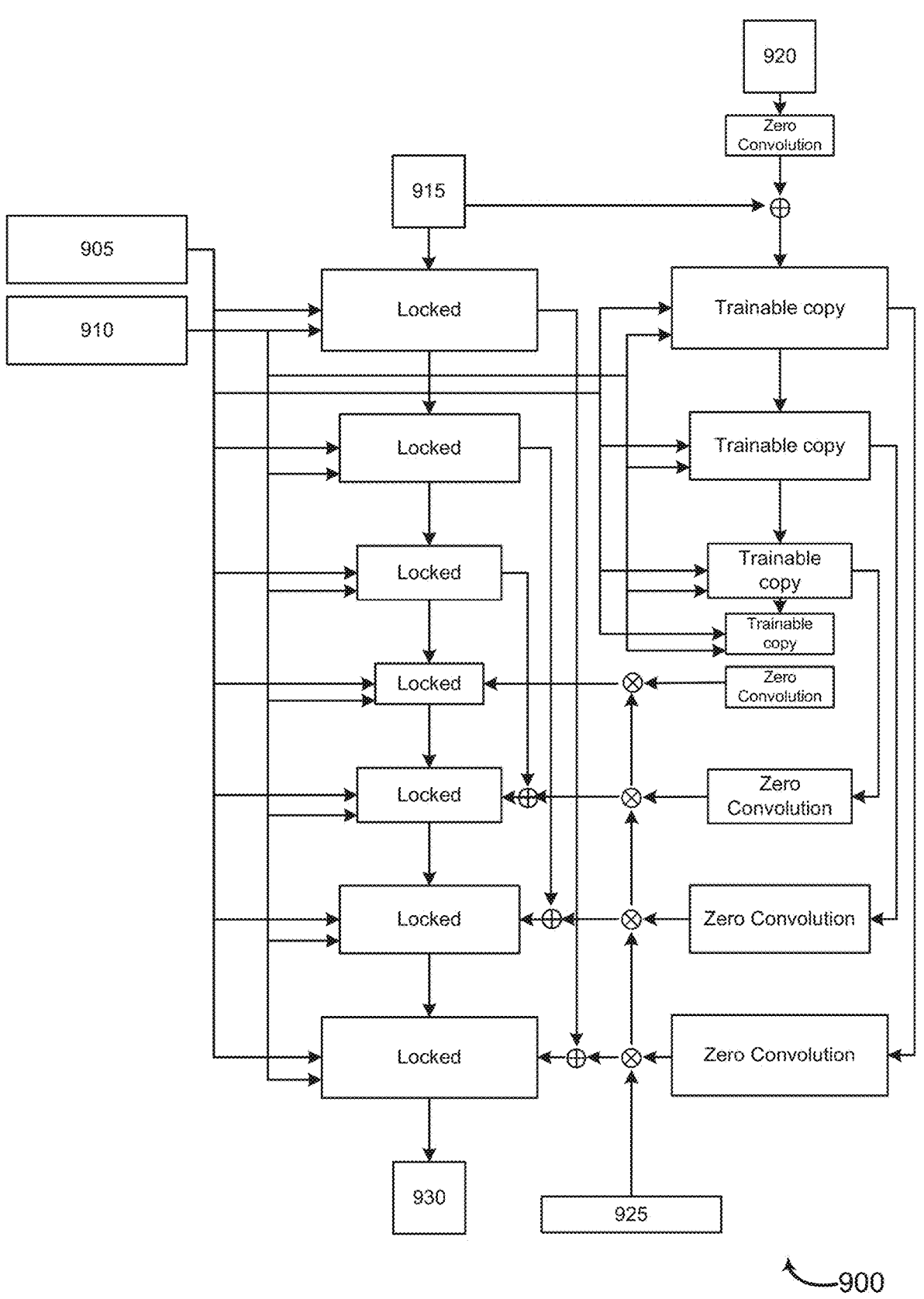
FIG. 9 shows an example of a sketch encoder with an adherence factor mechanism according to aspects of the present disclosure.

FIG. 9 shows an example of a sketch encoder with an adherence factor mechanism 900 according to aspects of the present disclosure. The sketch encoder 900 with an adherence factor mechanism 900 is an example of, or includes aspects of, the corresponding element described with reference to FIGS. 2-4, 6-8, 10, 11, and 13.

In some embodiments, an Adherence Factor in the image generation model enables users to exert nuanced control over image generation based on user-specific indications or hints. For example, the integration of the Adherence Factor addresses challenges posted by scribble-to-image transformation by providing control during the inference phase without requiring class conditioning during the training phase. In some examples, when the adherence factor is calibrated within a range of 0.3 to 0.6, the model achieves an admirable equilibrium between honoring the scribble and enhancing image quality. Rather than strictly replicating every facet of the scribble, the model upholds pivotal attributes, such as pose and orientation, but grants itself the latitude to accentuate and refine other elements. This engenders images congruent with user intent while simultaneously maintaining exemplary visual quality. This modulation capability offers users refined control, bridging the dichotomy between an authentic representation and superior image synthesis.

In some embodiments, the sketch encoder with an adherence factor mechanism demonstrates adaptability when given intricate scribbles. Beyond elementary representations, the image generation model generates images from intricate scribbles that encapsulate expansive visual narratives, spanning scenes, backgrounds, or composite visuals. The aptitude to interpret and replicate elaborate scribbles, particularly with an optimally adjusted Adherence Factor, highlights the model's potential across a myriad of graphic and design ventures.

Accordingly, the Adherence Factor increases the neural model's ability to process scribble-to-image transitions. By effectively balancing input accuracy with output quality, the model demonstrates an aptitude for refining basic sketches into detailed visuals. This advancement proves valuable in design contexts, facilitating quicker iteration and visualization from basic inputs. As the landscape of digital design advances, this method offers potential as a key tool, optimizing rapid prototyping and supporting design exploration.

For example, let $h_e \in \mathbb{R}^{h \times w \times 1}$ be a sketch/scribble that is used to generate an image, and let x be an optional text prompt for image generation. Let C be the guidance network with $\theta$ and $\theta_{tr}$ as its locked and trainable parameters, respectively, and f be the Adherence Factor. The generated image $y \in \mathbb{R}^{h \times w \times 3}$ is obtained as:

$$y = C(x, h_e, f; \theta, \theta_{tr}) \qquad (2)$$

Here, h=w=128, and the generated image is an RGB image in $\mathbb{R}^{128 \times 128 \times 3}$.

Referring to FIG. 9, in some embodiments, the image generation process using a modified ControlNet architecture is directed by guidance signals including sketch input 920 and text prompt 905. Text prompt 905 provides an additional layer of semantic context or directives for the image generation process, enhancing the specificity and relevance of the generated image to the user's intent. Sketch input 920 provides structural or stylistic guidance as the primary control signal.

In some embodiments, time 910 determines the stages of image generation within the diffusion process, affecting how noise map 915 and other inputs are processed over time. Time 910, when encoded and input into the sketch encoder, provides a temporal component for orchestrating the sequential nature of the diffusion process and managing the transformation of inputs into the final coherent output image.

In some embodiments, noise map 915 is an input for the diffusion model and contributes to the generation of high-quality images through the controlled introduction and subsequent reversal of noise. Noise map 915 is manipulated over time 910. This manipulation facilitates a gradual evolution of the output image 930. The evolution is influenced by directives from sketch encoder, which utilizes sketch input 920 and text prompt 905.

In some embodiments, adherence factor 925 is introduced as a parameter in the image generation model to modulate the model's compliance with the sketch or scribble provided by the user. Adherence factor 925 takes on values between 0 and 1, where a value of 1 indicates strict adherence to the sketch input 920, and a value of 0 indicates complete independence from the sketch input 920. The intermediate values allow for varying degrees of adherence, offering a continuum of possibilities between strict compliance and complete freedom. In some examples, during training, adherence factor 925 may be set to its maximum value to ensure full alignment with the sketch input 920. In some examples, during inference, the value of adherence factor 925 can be dynamically adjusted, allowing for a tailored response to user-provided sketches and enabling a flexible and adaptable image generation process.

In some embodiments, sketch input 920 acts as the primary control signal for guiding the image synthesis, encoded and interpreted by sketch encoder to ensure that the generated images conform to the user-specified structural guidance. This user-generated input allows for personalized and detailed control over the image generation process.

In some embodiments, output image 930 is the resultant image generated by the model, reflecting the combined influence of text prompt 905, sketch input 920, adherence factor 925, and the evolving noise map 915 over time 910. Output image 930 conforms to the user-defined input and is both visually cohesive and contextually aligned. The incorporation of adherence factor 925 allows for fine-tuning the level of detail and stylistic alignment of the output image with the initial user input, ensuring a high-quality and relevant final product.

Figure 10:
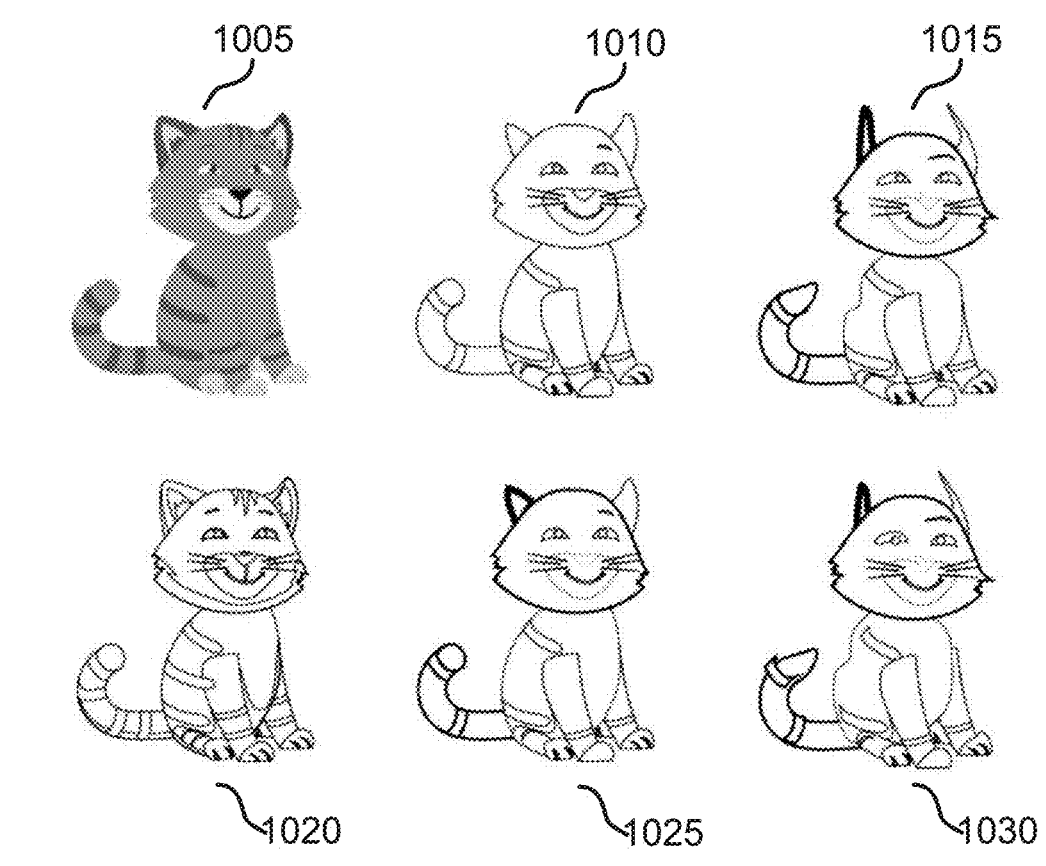
FIG. 10 shows an example of a data augmentation pipeline according to aspects of the present disclosure.
Figure 10:
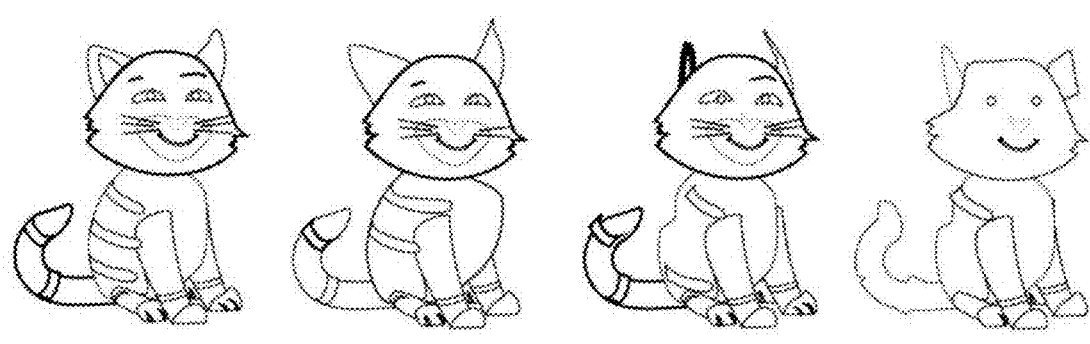

FIG. 10 shows an example of a data augmentation pipeline according to aspects of the present disclosure. The data augmentation pipeline is an example of, or includes aspects of, the corresponding element described with reference to FIGS. 2-4, 6-9, 11, and 13.

According to some embodiments, class conditioning is used with the image generation model. Class conditioning can serve multiple purposes including guiding image generation with varying levels of fidelity to the scribble hint provided to the model. Some embodiments use four discrete levels of fidelity. Class conditioning can be used to choose between generating outlined images and colored images. Some embodiments use four classes (1, 2, 3, 4) as fidelity levels for outlines and four classes as fidelity levels for colored images.

In some embodiments, a base model uses paired images and text data for training. Vector data is used for training. Various augmentations can be used to enhance the training data. In some cases, vector data is used, e.g., in SVG format. Various properties of the vector images can be modified including line, stroke, and fill properties. In some images, strokes are changed to black, and color fill properties are changed to white. In some cases, additional augmentations are applied on these modified black-and-white vector images. In some cases, the vector images are rasterized to obtain the training data.

In some embodiments, a real or a synthesized freehand scribble is provided as a control hint to the guidance network. For example, a ground truth vector image can be used for augmentations and randomness is introduced at one or more steps to generalize the training data. Once augmented, the vector images are rasterized to generate a control hint scribble image. In some embodiments, augmentations include various techniques.

For example, path dropping refers to dropping a fraction of paths from the vector image, creating vectors with fewer details. Stroke width augmentation refers to increasing or decreasing the stroke width of some paths of the vector image. Control point perturbation refers to perturbing control points of some paths of the vector image, creating a warping effect. This augmentation is useful for the model to generalize to user scribbles with distorted shapes. Path translation and rotation refers to translating and rotating some paths of the vector image, to mimic the user scribble having overlapping strokes, not necessarily rotationally aligned with the intended result.

Class conditioning refers to applying these augmentations with an augmentation strength based on multiple levels of class conditioning. The class information is passed to the model at training as well as inference time, allowing a user to control the fidelity of generation to the input scribble. Image level augmentations refers to performing augmentations in the image domain after the vector image is rasterized. For example, first extract the edge map (e.g., through HED or Canny edge detectors). Next, performing random binary thresholding, random pixel dropping, random edge dilation/erosion, random warping, etc. These augmentations, although good for photo-realistic images, may not generalize well for vector-looking colored images and outlines.

After obtaining vector-looking images from the image generation model, vectorization technology can be used to convert these images to vectors. The capability to generate meaningful coherent vectors from different types of user scribbles can be enhanced by creating vectorizable images. The model is also able to generate outlines and/or colored results with varying levels of fidelity to the input scribble, based on the class conditioning at inference time.

In some embodiments, after obtaining a vector-looking image from the sketch encoder model, a vectorization method is provided to convert these vector-looking images to vectors. Accordingly, embodiments of the present disclosure provide real-world applications with the capability to generate meaningful coherent vectors from different types of user scribbles. Embodiments of the present disclosure are also able to generate outlines and/or colored results with varying levels of fidelity to the input scribble, based on the class conditioning at inference time.

Referring to FIG. 10, in some embodiments, the data augmentation pipeline is depicted, illustrating various stages and techniques employed to refine and enhance vector images for the purpose of training an image generation model. The figure showcases a series of transformation processes applied to a vector image such as vector image 1005, each designed to simulate the variability and idiosyncrasies of human-drawn sketches and thereby enrich the model's training data.

In some embodiments, the first stage involves extracting an outline from the Original vector image 1005, resulting in an image where all strokes are changed to black, and color fill properties are changed to white, creating outline extracted through applying white-fill and black-stroke 1010. This serves as a foundational step for subsequent augmentations, stripping the image down to its essential structure.

SVG is an XML-based format for creating two-dimensional vector graphics. SVGs are made up of geometric shapes, allowing the SVGs to scale without losing quality.

This makes SVG an option for logos, icons, and illustrations that require clarity at various sizes. Additionally, SVG supports animations and interactivity, making it versatile for web use.

In some embodiments, the pipeline includes a random path dropping technique, shown as outline extracted through random path dropping 1015. This technique involves dropping a fraction of paths from the vector image, creating vectors with fewer details. It aims to simulate the incomplete or sketchy nature of some human drawings, preparing the model to interpret and complete such inputs.

In some embodiments, outline extracted through random stroke width augmentation 1020 represents the application of stroke width augmentation. This involves increasing or decreasing the stroke width of some paths of the vector image. This variability in stroke width helps mimic the natural inconsistency found in manual drawing and can make the model more robust to variations in user input.

In some embodiments, outline extracted through random control point perturbation 1025 depicts the perturbation of control points of some paths in the vector image, creating a warping effect. This augmentation is instrumental for the model to generalize to user scribbles that might have distorted or unconventional shapes, enhancing the model's ability to understand and interpret a wide range of artistic styles.

In some embodiments, outline extracted through random path translation and rotation 1030 reflects the techniques of translating and rotating some paths of the vector image. This step is designed to simulate the dynamic and often overlapping nature of user sketches, where strokes are not always perfectly aligned or isolated.

In some embodiments, the bottom row of FIG. 10 presents outlines with different levels of augmentations, controlled through class conditioning, showcasing the various degrees to which the original vector image can be altered. These levels, marked as augmentations=0, 1, 2, 3 respectively, represent incremental degrees of modification from the original, providing a spectrum of fidelity and complexity. This aspect of the figure illustrates the capability of the system to cater to different levels of detail and abstraction, allowing users to control the fidelity of the generation to the input scribble during both training and inference, thereby offering a tailored and versatile approach to image generation. Each level reflects a deeper degree of augmentation, demonstrating how class conditioning can finely tune the output to meet specific stylistic or structural preferences. Accordingly, embodiments of the present disclosure provide flexibility to control the fidelity of results with input scribbles, which allows users to generate variations and provides choices for specific use cases.

Figure 11:
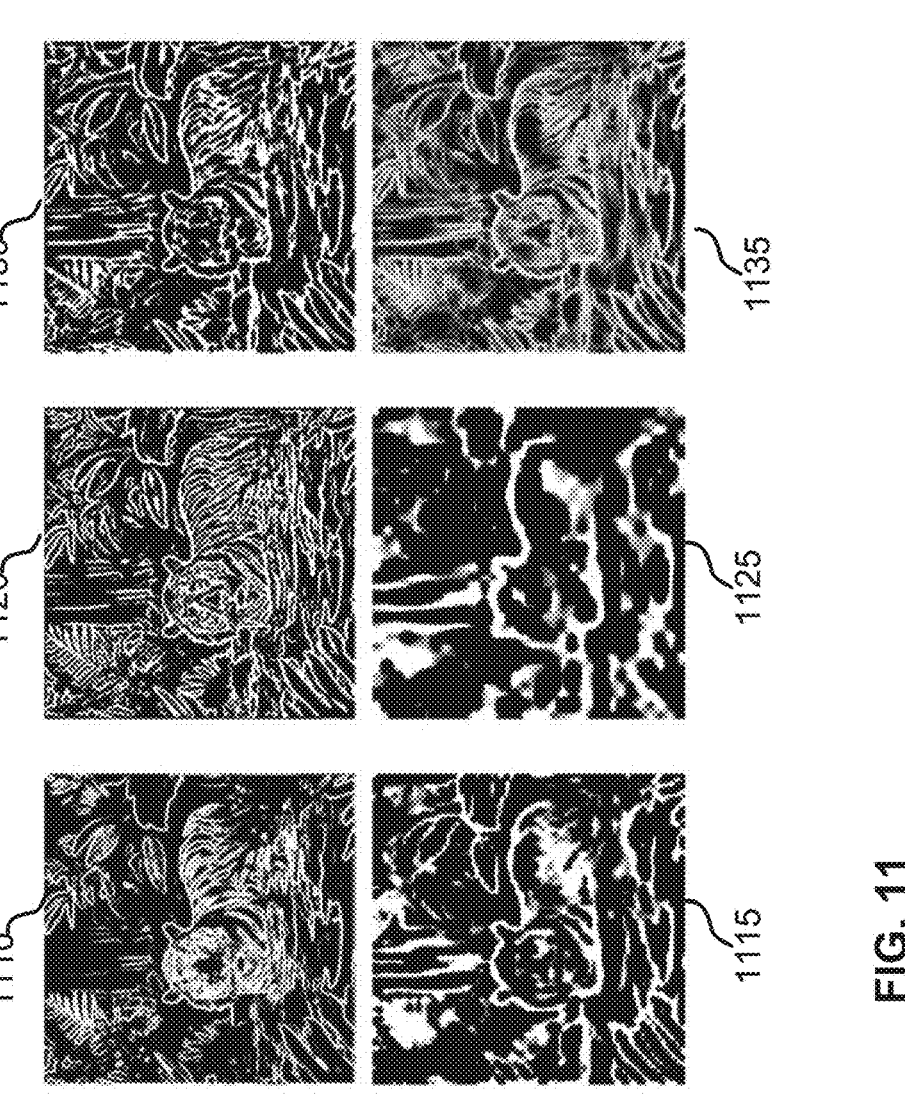
FIG. 11 shows an example database creation for training an image generation model according to aspects of the present disclosure.
Figure 11:

FIG. 11 shows an example of a database creation method for training an image generation model according to aspects of the present disclosure. The method for training the image generation model is an example of, or includes aspects of, the corresponding element described with reference to FIGS. 2-4, 6-10, and 13.

According to some embodiments, training a machine learning model with the capability for interpreting user sketches hinges on the procurement of an extensive, high-quality training dataset. Direct acquisition of authentic user sketches poses inherent challenges, primarily due to the considerable manual input involved and the potential deficiency in capturing the necessary diversity integral for the robust training of the model. Given that authentic sketches invariably embody human intent, spontaneity, and variability, it is essential that the derived training dataset, intended to mirror these traits, is thorough and faithfully representative of these inherent characteristics. To address this challenge, embodiments of the present disclosure generate new training data that simulate user sketches.

In some embodiments, a Holistically-Nested Edge Detection (HED) algorithm is used. HED generates multi-resolution side outputs and therefore can adeptly discern edges across multiple scales. In the image generation model, each layer is tailored to detect edge information at distinct granularities, from capturing expansive forms to intricate details. Initial layers emphasize delicate details and pronounced edges, while deeper layers are attuned to recognizing overarching structures and patterns. Notably, HED combines the side output and synthesizes them into a singular, detailed, and encompassing edge map.

According to some embodiments, a stochastic mechanism is implemented in processing the images via HED. Implementing the stochastic mechanism bolsters the integrity of the dataset, compared with using a deterministic approach of exclusively utilizing specific layer outputs or the combined output is eschewed. By electing with randomness from among the side outputs or the amalgamated output, the dataset is ensured to encapsulate a vast spectrum of edge definitions. This method enhances the richness of the dataset and fortifies it against potential biases, aligning the training methodology with the multifaceted nature of user sketches.

In some embodiments, a novel pipeline for generating data samples for training and providing a method to control the fidelity of the generated image with the input scribble. This method includes randomly choosing from the side outputs of Holistically Nested Edge detection (HED) applied on an input image, for generating data with varying levels of details, enhancing the model's generalization capacity.

In some embodiments, a method is provided to control the fidelity of the generated result to the input scribble at inference time. The method provided for controlling adaptor strength is not limited to a ControlNet, but is applicable to configuration that is adaptor-based. Accordingly, embodiments of the present disclosure provide a generic method for incorporating fine control with user-provided hints.

Subsequent to the utilization of the HED algorithm, the dataset undergoes refinement via a diverse array of augmentation techniques. A random pixel omission technique is invoked, periodically excising pixels to simulate sporadic discontinuities inherent in sketches. To foster spatial invariance in the model, random spatial translations and rotations across varied angles are incorporated. To encapsulate nuances in line softness and resolution, a Gaussian blur is integrated. Collectively, these methods reinforce the resilience of the training data, ensuring an encompassing and representative training milieu for the model. The output is resized to predefined specifications of the model. For example, the output is resized to a resolution of 128×128.

Referring to FIG. 11, a database creation method is illustrated for enhancing the capability of machine learning models to interpret user sketches by generating a comprehensive and diverse training dataset. FIG. 11 illustrates the use of a Holistically-Nested Edge Detection (HED) algorithm to produce multi-resolution side outputs, capturing the intricacy and variability inherent in authentic user sketches.

In some embodiments, original image 1105 is processed using the HED algorithm to generate multiple side outputs, each representing a distinct level of detail and abstraction. These side outputs include first side output 1110, second side output 1115, third side output 1120, fourth side output 1125, and fifth side output 1130. Each layer in the HED algorithm is tailored to detect edge information at specific granularities, with initial layers focusing on delicate details and pronounced edges, and deeper layers attuned to recognizing broader structures and patterns.

In some embodiments, a stochastic mechanism is implemented in processing the images via HED. This approach ensures that a wide spectrum of edge definitions is captured, enhancing the richness and robustness of the dataset. By randomly selecting from among the side outputs or the combined fused output, the dataset is diversified, making it more representative of the multifaceted nature of user sketches.

In some embodiments, the fused output 1135 represents the amalgamation of the multiple side outputs into a singular, comprehensive edge map. This fusion synthesizes the various levels of detail into a detailed and encompassing representation, aligning closely with the spontaneous and varied nature of human-drawn sketches.

In some embodiments, subsequent to the utilization of the HED algorithm, the dataset undergoes further refinement via a diverse array of augmentation techniques. These techniques aim to simulate the discontinuities, spatial variability, and nuances typically found in hand-drawn sketches, thereby preparing the model to handle a wide range of user inputs and artistic styles.

In some embodiments, the outputs from the HED algorithm, including the side outputs and the fused output, are randomly selected and resized to predefined specifications of the model, such as 128×128 resolution. This selection process, combined with the subsequent resizing, ensures that the training data is not only diverse and representative but also compatible with the model's requirements, facilitating an effective and efficient learning process. Accordingly, the database creation method in FIG. 11 represents the sophisticated and nuanced approach taken to generate training data that closely mirrors the inherent characteristics of authentic sketches, empowering the image generation model to produce results that are faithful to user inputs and creatively fulfilling.

Figure 12:
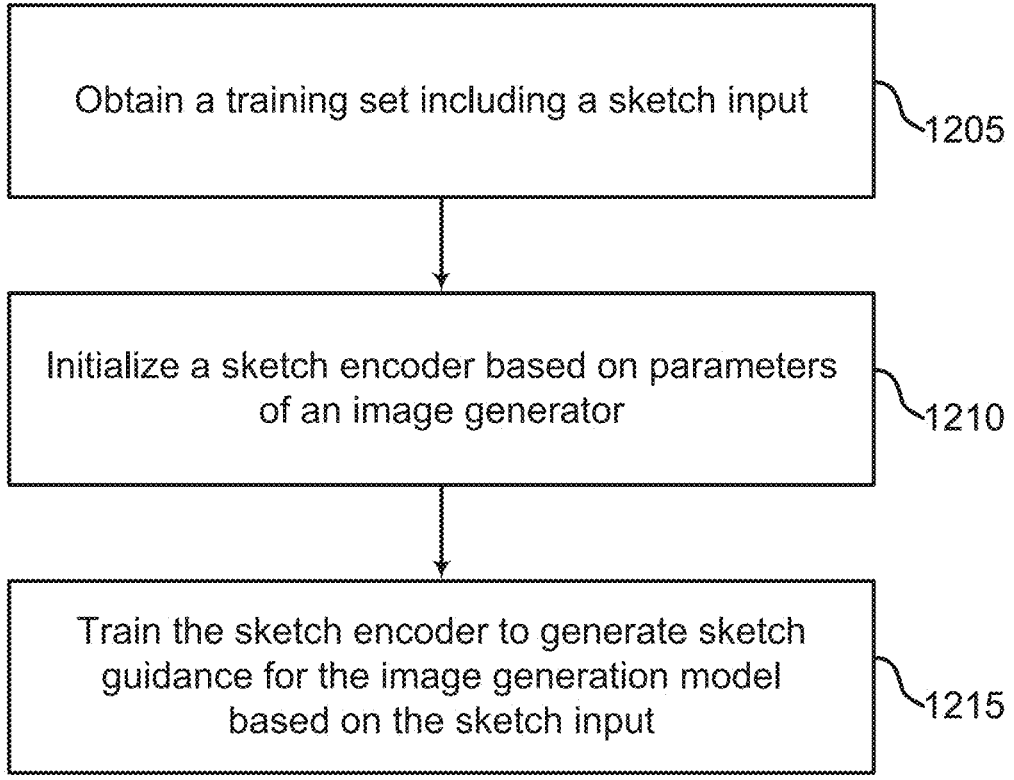
FIG. 12 shows an example of a method for image processing according to aspects of the present disclosure.

FIG. 12 shows an example of method 1200 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system creates a training set including a sketch input. In some cases, the operations of this step refer to, or may be performed by, a training component as described with reference to FIG. 6.

For example, at operation 1205, the system creates a training set including a sketch input. In some cases, this step involves compiling or generating a variety of sketches for training the sketch encoder. The sketches in the training set can be obtained from direct user inputs, databases of sketches, or generated synthetically to represent a wide range of styles, details, and complexities. According to some embodiments, this diversity ensures that the sketch encoder learns to interpret and process a broad spectrum of artistic inputs, enhancing its generalization capabilities and effectiveness.

At operation 1210, the system initializes a sketch encoder based on parameters of an image generation model. In some cases, the operations of this step refer to, or may be performed by, a training component as described with reference to FIG. 6.

For example, at operation 1210, the system initializes a sketch encoder based on parameters of an image generation model. In some cases, initializing the sketch encoder involves copying the parameters of an encoder of the image generation model, ensuring a level of consistency and synergy between the two components. This initialization step is critical as it sets up the sketch encoder with a foundational set of parameters that will guide its learning and adaptation process during the training.

At operation 1215, the system trains the sketch encoder to generate sketch guidance for the image generation model based on the sketch input. In some cases, the operations of this step refer to, or may be performed by, a training component as described with reference to FIG. 6.

For example, at operation 1215, the system trains the sketch encoder to generate sketch guidance for the image generation model based on the sketch input. This training involves exposing the sketch encoder to various sketch inputs from the training set, allowing it to learn and refine its strategies for encoding these inputs into effective sketch guidance. For example, training the sketch encoder might involve generating a synthetic image based on an output of the sketch encoder and then computing a loss function based on the synthetic image and a ground-truth image. This process allows the system to gauge the accuracy and effectiveness of the sketch encoder, guiding its ongoing adaptation and improvement.

In some embodiments, creating the training set includes generating sketch inputs based on ground-truth images by applying a series of augmentations such as white-fill, black-stroke, path dropping, stroke width augmentation, control point perturbation, path translation, rotation, or any combination thereof. These augmentations introduce a range of variations and challenges to the sketches, mimicking the diversity found in authentic user inputs and preparing the sketch encoder to handle a wide array of artistic styles and complexities.

FIG. 13 shows an example of a computing device 1300 according to aspects of the present disclosure. computing device 1300 includes processor(s) 1305, memory subsystem 1310, communication interface 1315, I/O interface 1320, user interface component(s) 1325, and channel 1330. In some embodiments, computing device 1300 is an example of, or includes aspects of, the image generation apparatus described with reference to FIGS. 2-4, and 6-11.

In some embodiments, computing device 1300 includes one or more processors 1305 that can execute instructions stored in memory subsystem 1310 to generate synthetic images comprising a first attribute and a second attribute by providing a first attribute token to a first set layers of the image generation model during a first set of time-steps and providing a second attribute token to a second set of layers of the image generation model during a second set of time-steps According to some aspects, computing device 1300 includes one or more processors 1305. Processor(s) 1305 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1310 includes one or more memory devices. Memory subsystem 1310 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component 1325 enables a user to interact with computing device 1300. In some cases, user interface component 1325 includes an audio device, such as an external speaker system, an external display device such as a display screen, an input device (e.g., a remote-control device interfaced with a user interface directly or through the I/O controller), or a combination thereof. In some cases, user interface component 1325 includes a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
obtaining a sketch input depicting an object;
processing, using a sketch encoder, the sketch input to obtain sketch guidance, wherein the sketch encoder is initialized by copying parameters of an image generation model and trained to generate sketch guidance for the image generation model based on a training sketch input; and
generating, using the image generation model, a synthesized image based on the sketch guidance, wherein the synthesized image depicts the object from the sketch input.

2. The method of claim 1, further comprising:
obtaining a text prompt; and
encoding the text prompt to obtain a text encoding, wherein the synthesized image is generated based on the text encoding.

3. The method of claim 1, wherein generating the synthesized image comprises:
providing the sketch guidance as an input to a decoder layer of the image generation model.

4. The method of claim 1, further comprising:
generating a vector image based on the synthesized image.

5. The method of claim 1, wherein generating the synthesized image comprises:
performing a reverse diffusion process.

6. The method of claim 1, wherein encoding the sketch input comprises:
obtaining a noisy input image for the image generation model, wherein the synthesized image is based on the noisy input image.

7. The method of claim 1, wherein encoding the sketch input comprises:
obtaining a class label indicating a category of the synthesized image, wherein the sketch guidance is generated based on the class label.

8. The method of claim 7, wherein:
the category is selected from a set of categories including an outline category and a color image category.

9. The method of claim 1, wherein generating the synthesized image comprises:
obtaining an adherence factor indicating a degree of adherence of the synthesized image to the sketch input, wherein the synthesized image is generated based on the adherence factor.

10. The method of claim 9, wherein generating the synthesized image comprises:
applying the adherence factor to the sketch guidance prior to providing the sketch guidance to the image generation model.

11. The method of claim 1, wherein:
the sketch encoder and the image generation model are diffusion models.

12. A method for training a machine learning model, comprising:
obtaining a training set including a sketch input;
initializing a sketch encoder based on parameters of an image generation model; and
training the sketch encoder to generate sketch guidance for the image generation model based on the sketch input;
wherein training the sketch encoder comprises:
generating, using the image generation model, a synthetic image based on an output of the sketch encoder; and
computing a loss function based on the synthetic image and a ground-truth image.

13. The method of claim 12, wherein creating the training set comprises:
generating the sketch input based on a ground-truth image by applying white-fill, black-stroke, path dropping, stroke width augmentation, control point perturbation, path translation, rotation, or any combination thereof.

14. The method of claim 12, wherein initializing the sketch encoder comprises:
copying the parameters of an encoder of the image generation model.

15. An apparatus comprising:
at least one processor;
at least one memory storing instruction executable by the at least one processor;
a sketch encoder comprising parameters stored in the at least one memory and trained to generate sketch guidance based on a sketch input, wherein the sketch encoder is trained using a sketch input that is generated based on a ground-truth image by applying white-fill, black-stroke, path dropping, stroke width augmentation, control point perturbation, path translation, rotation, or any combination thereof; and
an image generation model comprising instruction stored in the at least one memory and trained to generate a synthesized image based on the sketch guidance.

16. The apparatus of claim 15, wherein:
the image generation model comprises a diffusion model.

17. The apparatus of claim 15, wherein:
the sketch encoder comprises a zero-convolution layer and a layer based on an encoder layer of the image generation model.

* * * * *